C. J. ELLSWORTH.
METHOD FOR MAKING BULLETS, ESPECIALLY SHRAPNEL.
APPLICATION FILED DEC. 23, 1914.
1,309,938.
Patented July 15, 1919.
3 SHEETS—SHEET 1.
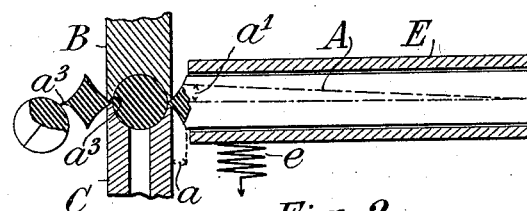
Fig. 1.
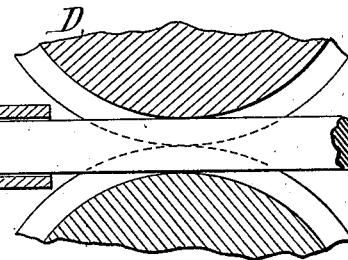
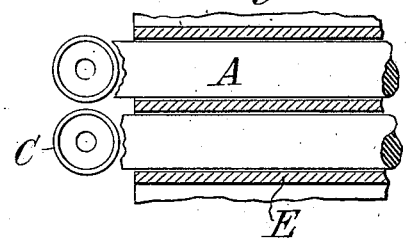
Fig. 2.
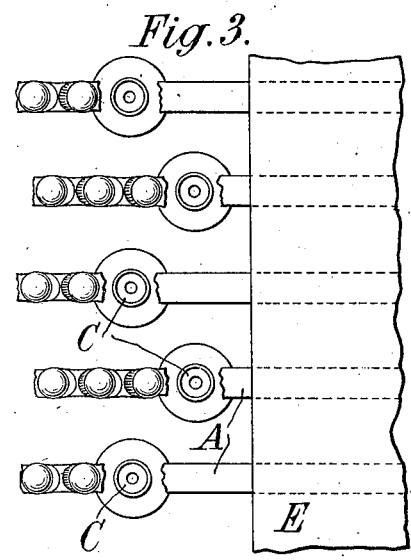
Fig. 3.
Fig. 4.
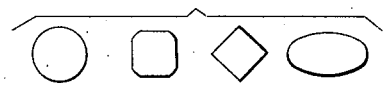
Fig. 13.
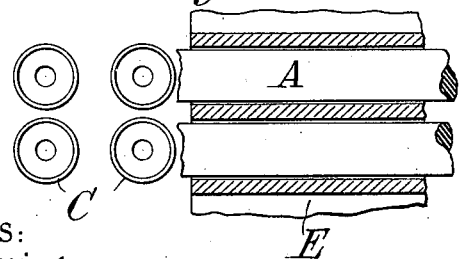
Fig. 5.
WITNESSES:
INVENTOR:
Charles J. Ellsworth,
By Attorneys,

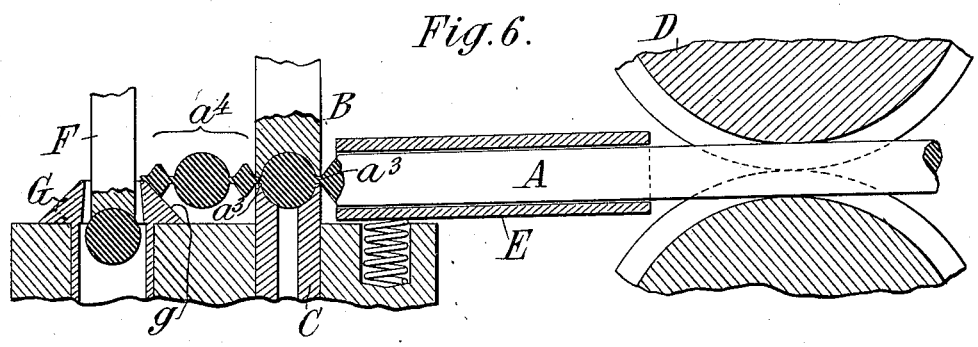
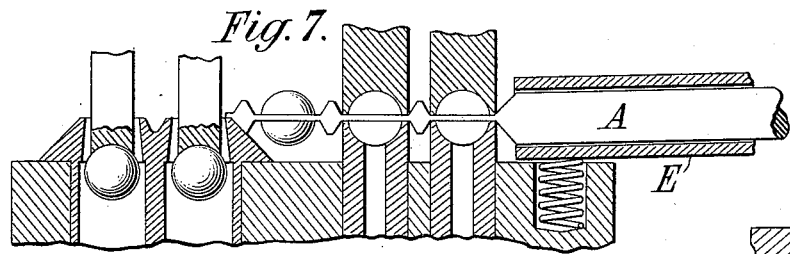
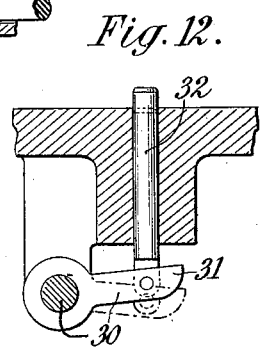
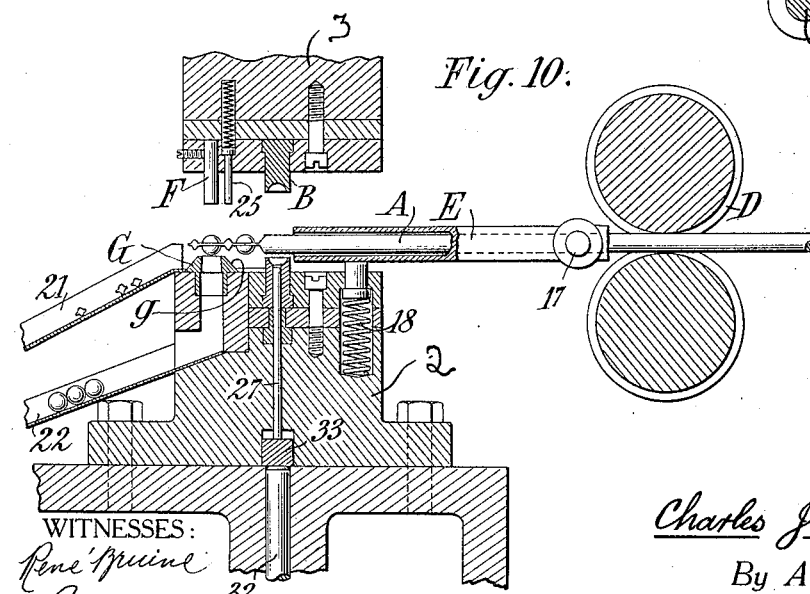

C. J. ELLSWORTH.
METHOD FOR MAKING BULLETS, ESPECIALLY SHRAPNEL.
APPLICATION FILED DEC. 23, 1914.

1,309,938.

Patented July 15, 1919.
3 SHEETS—SHEET 3.

WITNESSES:
Rene Bruine
Gustave R Thompson

INVENTOR:
Charles J. Ellsworth,
By Attorneys,
Fraser, Dark & Myers

THE COLUMBIA PLANOGRAPH CO., WASHINGTON, D. C.

UNITED STATES PATENT OFFICE.

CHARLES J. ELLSWORTH, OF BROOKLYN, NEW YORK, ASSIGNOR TO E. W. BLISS COMPANY, OF BROOKLYN, NEW YORK, A CORPORATION OF WEST VIRGINIA.

METHOD FOR MAKING BULLETS, ESPECIALLY SHRAPNEL.

1,309,938.   Specification of Letters Patent.   Patented July 15, 1919.

Application filed December 23, 1914. Serial No. 878,703.

*To all whom it may concern:*

Be it known that I, CHARLES J. ELLSWORTH, a citizen of the United States of America, residing in the borough of Brooklyn, county of Kings, city and State of New York, have invented certain new and useful Improvements in Methods for Making Bullets, Especially Shrapnel, of which the following is a specification.

This invention relates to a process for forming slugs, bullets, shrapnel balls, and the like, and aims to provide improvements therein.

According to the best known of present methods for manufacturing slugs, bullets, shrapnel balls and the like, pieces of metal, of approximately the mass necessary for forming the article, are first cut off from a bar or strip, and then shaped by dies to the desired form.

By the present invention the slugs or the like are formed directly from a rod or strip of metal, without previous separation of the part of the rod or strip which is shaped into the slug.

By the present invention there is a great increase in the rapidity and in the ease, with which the process may be carried out.

The invention will be more fully described in connection with the accompanying drawings.

Figure 1 illustrates one embodiment of the present improved method;

Fig. 2 illustrates the method, according to Fig. 1, wherein a plurality or series of dies is employed;

Fig. 3 illustrates the method, according to Fig. 1, wherein a plurality of dies, in staggered series, is employed;

Figs. 4 and 5 illustrate the process, according to Fig. 1, wherein a plurality or series of dies, in line with the feed of the rod or strip, is employed;

Figs. 6 and 7 illustrate modifications of the process;

Fig. 10 is an enlarged vertical sectional view on the line 10—10, Fig. 9;

Fig. 12 illustrates a detail of the knockout mechanism;

Fig. 13 illustrates some forms of slugs, bullets, or the like, which may be formed by the present invention.

Figure 8:
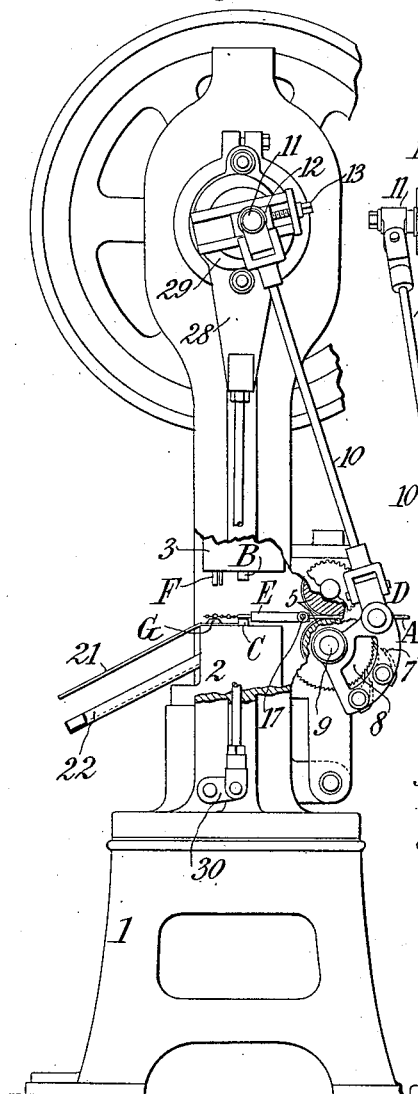
Fig. 8 illustrates an embodiment of an apparatus which may be used in carrying out the process, the apparatus being shown in side elevation, with parts broken away.

Referring to the drawings, A designates a rod or stock of metal from which the slugs and the like are to be formed, B and C a pair of forming or shaping dies, and D a suitable feed device, preferably in the form of rolls. The rods or stock A may be of any suitable or desired shape, though round stock is preferable.

The rod A is intermittently fed to the dies B and C, which operate to give the successive portions of the rod the desired form. The feed is preferably such as to bring a length of stock beneath the forming dies sufficient to provide the necessary mass in the formed article. As the dies cut through the rod or stock, there is usually a forcing back or away of the metal on the outside of the die, as indicated by $a$, Fig. 1. In carrying out the process, it is preferable to allow the rod or stock A to move or yield under this force. This movement or yielding of the rod or stock may be accomplished in various ways. As here shown, it may be conveniently done by locating the dies somewhat away from the feeding means, so as to leave a length of rod or stock between the dies and feeding means, which may flex or yield under the force exerted by the dies. Or, the feeding means may be so arranged as to yield.

Where the dies and feeding means are located at some distance apart, it is preferable to guide or support the length of the rod or stock located between the feeding means and the dies. It is also preferable, where one stationary and one movable die is used, to permit the rod or stock to yield in the direction of movement of the moving die, as indicated by the arrow $a'$, Fig. 1. It is also preferable that, following the operation of the dies, the end of the rod or stock adjacent the dies should move back, or be moved back, so that its axis, and preferably its lower edge, will move back or resume a position above the edge of the stationary die. This part of the process may be conveniently carried out by providing a part E, conveniently designated a guide, between the feeding means and the dies, which guide preferably is formed with a hole therethrough, through which the rod or stock passes, and is adapted to move in the direction of movement of the movable die when the dies operate. The movement may be effected by the force of the die acting on the guide through the rod or stock, or by a part carried by the die or other part of the machine. A spring $e$ is preferably provided for moving back or returning the guide E to a position wherein the axis, or lower edge of the rod or stock, is above the edge of the stationary die.

In carrying out the process, a plurality of dies is preferably provided, and a plurality of rods or pieces of stock are simultaneously fed to the dies. The dies may be arranged in line, transverse to the feed, as shown in Fig. 2, or in staggered series, as shown in Fig. 3. The dies may also be arranged in series in line with the direction of feed, and the rod or stock fed in such manner that the stock is brought between each pair of dies. The dies, in line with the feed, are preferably located at a distance apart, as indicated at $a^2$, Fig. 4, in order to allow a movement of the stock away from the outer faces of the dies, as explained in connection with Fig. 1.

A plurality of parallel series of dies in line with the feed, as shown in Fig. 5, may be provided, and a plurality of rods or pieces of stock fed thereto.

The dies may be made to approach so close together that only a very small "flash" or web, $a^3$, is left, uniting the formed pieces with the stock and scrap. The formed devices may be readily separated from the scrap, if desired, by tumbling.

According to a modification of the process, (referring to Fig. 6) the forming dies B and C may be so set that the web or "flash", $a^3$, is of appreciable thickness, the formed article being fed from the forming die to a pair of stripping dies F and G, which act to strip the formed articles from the scrap, and from the "flash" or web connecting the articles to the scrap. The "flash" or web is preferably of such thickness that the strip of formed articles and scrap between the forming dies and stripping dies will possess appreciable rigidity. The stripping dies F and G are preferably spaced somewhat from the forming dies B and C, so that there may be a strip of a formed article, or articles, and connected scrap between the forming dies and the stripping dies. This strip between the forming dies and the stripping dies is adapted to yield or flex under the pushing force of the forming dies on the portion of the stock at the side of the forming dies facing the stripping dies.

The shaped articles are also preferably acted on by the stripping die prior to the time that the forming dies begin to act upon the stock, so that the stripping may be performed prior to the pushing action of the forming dies on the strip between the forming and stripping dies. One of the stripping dies is preferably provided with a beveled face $g$, over which the shaped articles will ride as the rod or stock is fed to the dies.

A plurality of shaping and stripping dies in line with the feed of the strip may be provided, as heretofore described.

A plurality of dies, or series, and a plurality of strips may be employed, as heretofore described.

The shaped articles may have a variety of forms, as indicated in Fig. 13.

Figure 9:
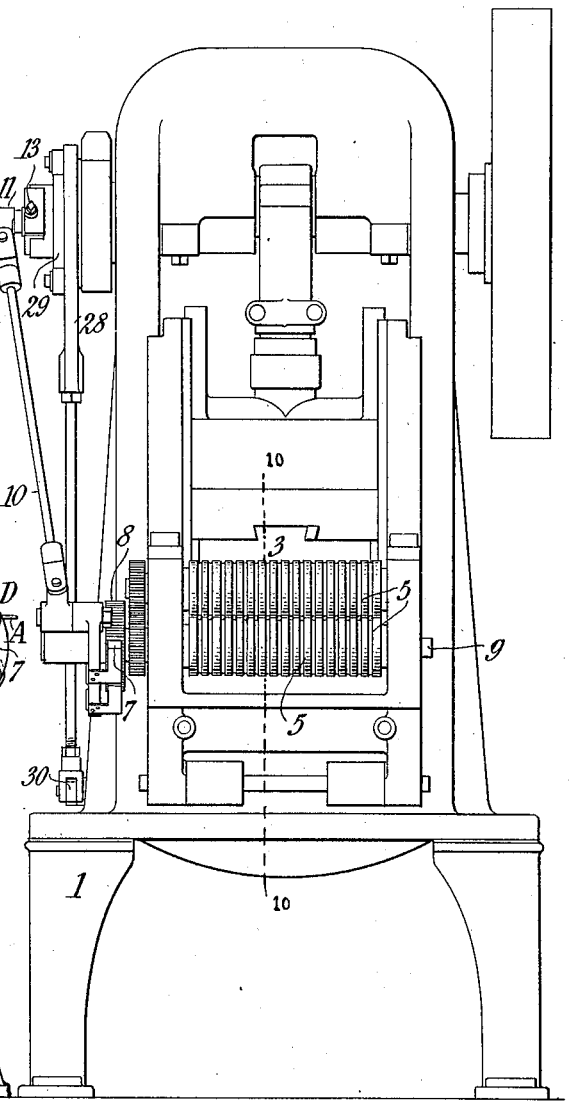
Fig. 9 is a front elevation of the apparatus shown in Fig. 8.
Figure 11:
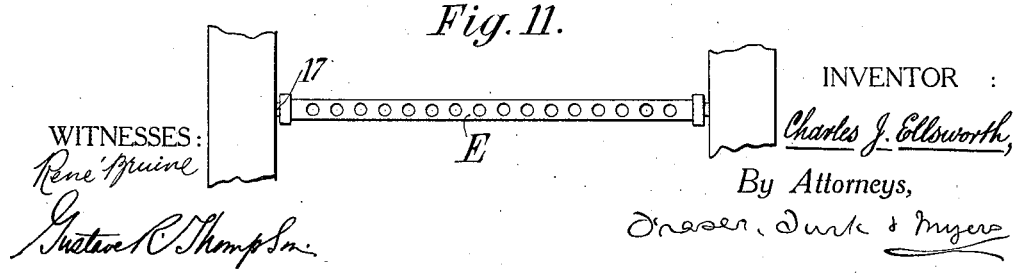
Fig. 11 illustrates a detail.

An apparatus in which the process may be conveniently carried out, is illustrated in Figs. 8 to 12.

Numeral 1 designates a die press of any suitable construction. 2 designates the bed of the press, and 3, the head or plunger. The forming dies B and C are mounted upon the plunger and bed respectively. A plurality of the forming or shaping dies B and C transverse to the direction of feed, may be provided, and a plurality of rods or stock fed thereto. Or a plurality of forming dies B and C in line with the feed of the rods or stock may be provided, and the rods or stock fed thereto with a length of feed sufficient to bring the rod or stock under all of the dies of the series. Suitable means D for feeding the bars or stock to the forming dies, may be provided. The feeding means D is preferably in the form of a pair of geared feed rollers 5, which may be suitably operated to intermittently feed the rods or stock, as by means of a pawl and ratchet mechanism 7 and 8, which may be mounted upon the shaft 9 of one of the rollers 5, and actuated by means of a rod 10 connected to an eccentric pin or the like, 11, mounted on one of the moving parts of the press. Means for adjusting the throw of the pawl is preferably provided. This may conveniently be a block 12, on which the eccentric pin 11 is mounted, the eccentricity of which may be adjusted by means of a screw 13. The feeding device D is preferably spaced somewhat from the forming dies, so that the length of the rod or stock between the forming dies and the feed device, may yield or flex under the pressure lengthwise of the rod or stock which may be exerted by the dies in acting on the rod or stock.

For guiding the rods or stock between the feeding device D and the forming dies B and C, a device E, which may be designated a guide, is preferably provided. The guide E is preferably pivoted, as indicated by numeral 17, Figs. 8 and 11, in the frame of the press adjacent the feed rollers. Where one of the forming dies is stationary, as here shown, the end of the guide adjacent the forming dies preferably has a limited vertical movement. The guide plate E is preferably supported by a relatively light spring 18 (Fig. 10), which is adapted to yield under the pressure of the forming die B transmitted through the stock, or under the action of other means. The guide E, after yielding, is preferably adapted to return to a position to bring the lower edge of the rod or stock above the edge of the stationary die, so that when the rod or stock is fed forward, it will not be obstructed by the die.

The guide E is preferably in the form of a plate having holes bored therethrough for the passage of the rod or stock.

The guide E may also conveniently be of appreciable weight, so as to exert (through the web or "flash" connecting the formed articles with the stock) a force tending to separate the formed article from the die, as the die moves away, the article having a tendency to stick to the upper die.

The forming dies may be set so as to approach so close together that a very small web or "flash" is left between the formed article and the scrap. The formed articles, after leaving the shaping dies, may be removed to a tumbling machine, and separated from the scrap by tumbling.

In the preferred embodiment of the apparatus, however, the forming dies are set so as to leave a "flash" or web of appreciable thickness between the formed articles and the stock and scrap, the thickness being such that the strip of formed articles and scrap possesses appreciable rigidity. The formed articles, after leaving the forming dies, pass to stripping dies F and G, which act to strip the formed articles from the scrap and from the web or "flash" connecting the formed articles to the scrap.

Chutes 21 and 22 may be provided for carrying off the scrap and shaped articles respectively.

The stripping dies are preferably spaced somewhat from the forming dies in such manner as to leave a strip of a formed article, or articles, and connected scrap, between the forming dies and the stripping dies, so that the strip may yield or flex under the pressure of the forming die on that side of the forming die which faces the stripping die.

The stripping dies are preferably adapted to act to strip the shaped articles prior to the action of the forming dies on the preceding portion of the rod or stock, so that the articles will be stripped prior to the flexing or yielding of the strip between the forming and stripping dies. A light spring-pressed finger 25 adjacent the stripping die F, is preferably provided for pushing down the strip of shaped articles and scrap between the forming and stripping dies, in case this strip should be buckled or be out of correct position.

The die G may be provided with a beveled face $g$, to facilitate the feeding of the shaped articles into position between the upper and lower stripping dies.

Knock-outs 27 may be provided for pushing the formed articles out of the dies. The knock-outs 27 may be conveniently actuated by a rod 28 receiving motion at one end from a cam 29 connected to a moving part of the press, and connected at its outer end to a rock shaft 30 having arms 31 thereon (Fig. 12) adapted to reciprocate pins 32 bearing on the under-side a transverse strip 33, against which the lower ends of the knock-outs bear.

The inventive ideas may receive other mechanical or formal expressions than those herein specifically described or illustrated within the scope of the appended claims.

What is claimed is:—

1. A process for making slugs, bullets or the like, comprising feeding a bar or stock of metal to cupped shaping dies, and stamping completely-shaped articles out of the stock, and having a sufficient length of stock between the dies and feeding means to permit said stock to flex or yield in the line of feed when acted upon by said dies.

2. A process for making slugs, bullets or the like, comprising feeding a bar or stock of metal to cupped shaping dies, and stamping completely-shaped articles out of the stock, and having a sufficient length of stock between the dies and feeding means to permit said stock to flex or yield in the line of feed when acted upon by said dies, and guiding said stock intermediate the feeding means and dies.

3. A process for making slugs, bullets or the like, comprising feeding a bar or stock of metal to cupped shaping dies, and stamping completely-shaped articles out of the stock, and having a sufficient length of stock between the dies and feeding means to permit said stock to flex or yield in the line of feed when acted upon by said dies, and supporting said stock intermediate the feeding means and dies.

4. A process for making slugs, bullets or the like, comprising feeding a bar or stock of metal to cupped shaping dies, and stamping completely-shaped articles out of the stock, and having a sufficient length of stock between the dies and feeding means to permit said stock to flex or yield in the line of feed when acted upon by said dies, and guiding said stock intermediate the feeding means and dies, and permitting said stock to move in the line of movement of said dies.

5. A process for making slugs, bullets or the like, comprising forming in cupped dies completely shaped slugs in successive portions of a bar or stock, and leaving a web or "flash" of appreciable thickness between the formed article and the stock, and feeding the strip of connected articles and scrap to stripping dies in line with the forming means for stripping the articles from the scrap, and performing the stripping at a time beginning before the action of the forming dies.

It witness whereof, I have hereunto signed my name in the presence of two subscribing witnesses.

CHARLES J. ELLSWORTH.

Witnesses:
FRED. H. McGAHIE,
CULVER S. SNIPPEN.

Copies of this patent may be obtained for five cents each, by addressing the "Commissioner of Patents, Washington, D. C."